United States Patent [19]

Naveen et al.

[11] Patent Number: 5,712,687
[45] Date of Patent: Jan. 27, 1998

[54] CHROMINANCE RESAMPLING FOR COLOR IMAGES

[75] Inventors: T. Naveen; Ali Tabatabai, both of Beaverton, Oreg.

[73] Assignee: Tektronix, Inc., Wilsonville, Oreg.

[21] Appl. No.: 637,517

[22] Filed: Apr. 25, 1996

[51] Int. Cl.$^6$ .................................................. H04N 11/02
[52] U.S. Cl. ................................................ 348/453; 348/441
[58] Field of Search ........................... 348/453, 441, 348/708, 450, 452, 630; 340/154, 153; 395/131

[56] References Cited

U.S. PATENT DOCUMENTS

| | | | |
|---|---|---|---|
| 5,124,688 | 6/1992 | Rumball | 340/154 |
| 5,387,937 | 2/1995 | Dorricott et al. | 348/453 |
| 5,475,436 | 12/1995 | Watanabe et al. | 348/441 |
| 5,555,030 | 9/1996 | Takamoto et al. | 348/453 |
| 5,574,506 | 11/1996 | Rhodes | 348/441 |

OTHER PUBLICATIONS

ISO/IEC 13818–2: 1995(E) Recommendation ITU–T H.262 (1995 E) p. 17–23.

*Primary Examiner*—Victor R. Kostak
*Attorney, Agent, or Firm*—Francis I. Gray

[57] ABSTRACT

Chrominance resampling for color images to produce an upsampled chrominance signal from a subsampled chrominance signal uses luminance to detect edges in the color image. The detection of edges produces an Index signal which is used to select a particular one of a plurality of lowpass filters for filtering a chrominance signal expanded from the subsampled chrominance signal. For interlaced video signals a field/frame decision is made based upon relative motion between the fields of each frame, which decision is input to the filter selection process. The resulting chrominance samples in the upsampled chrominance signal are offset to co-site the samples with the corresponding luminance samples at the output.

12 Claims, 4 Drawing Sheets

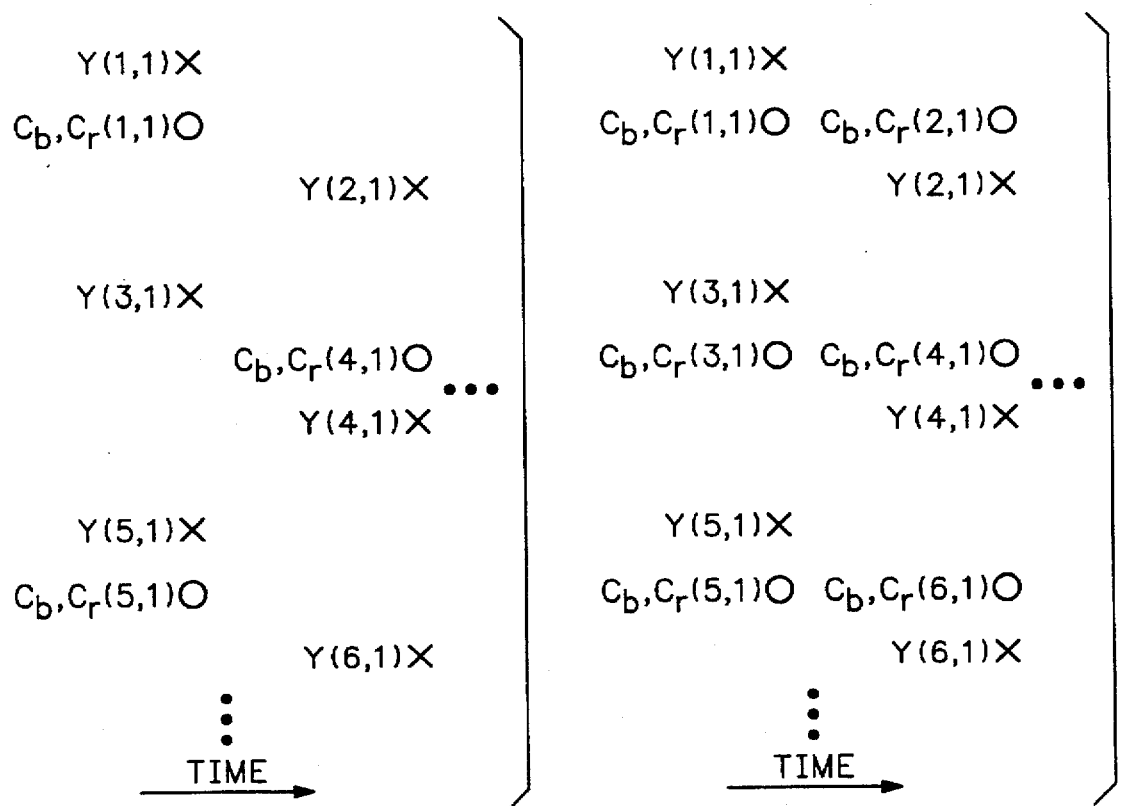

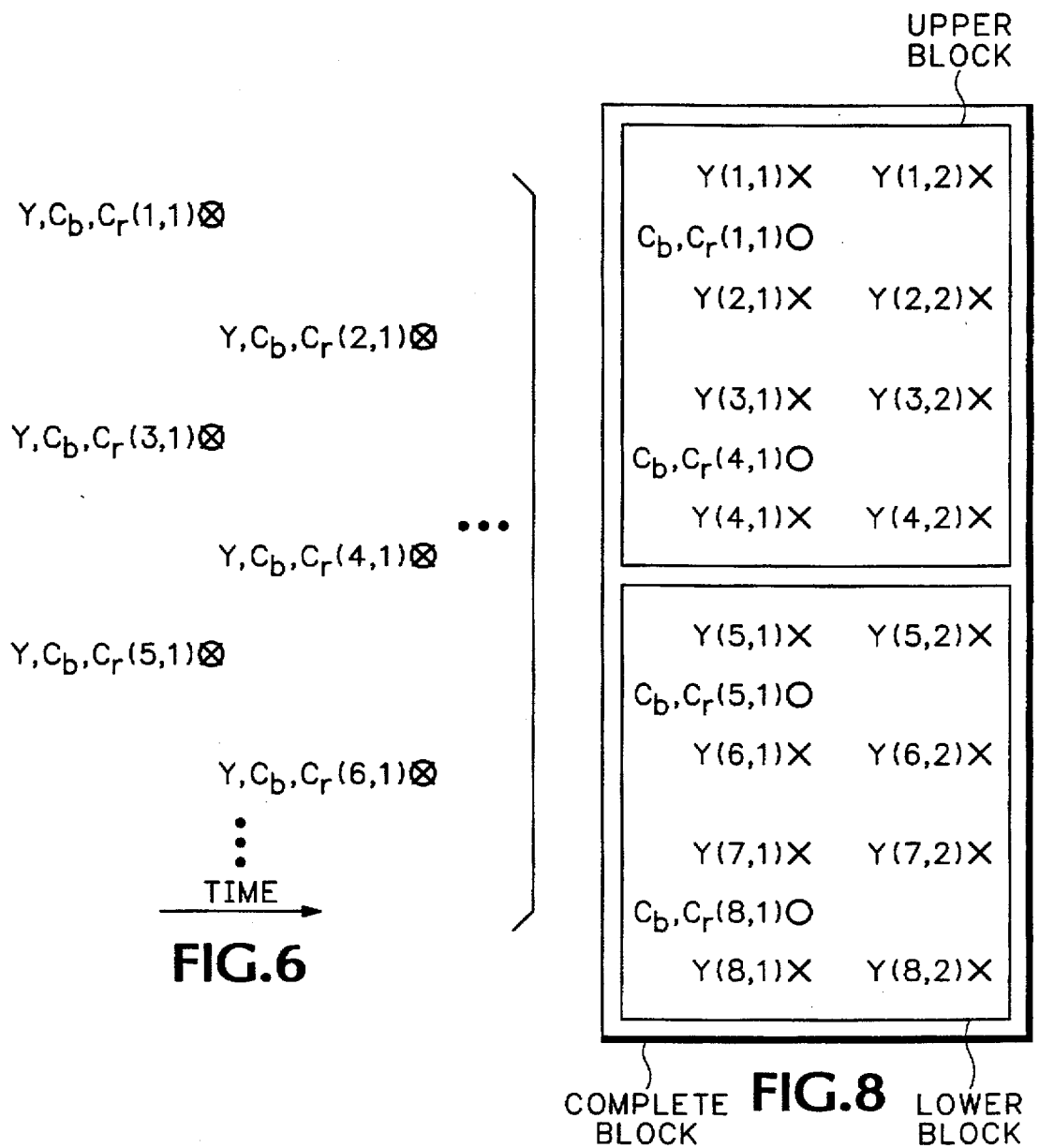
FIG.6
FIG.8
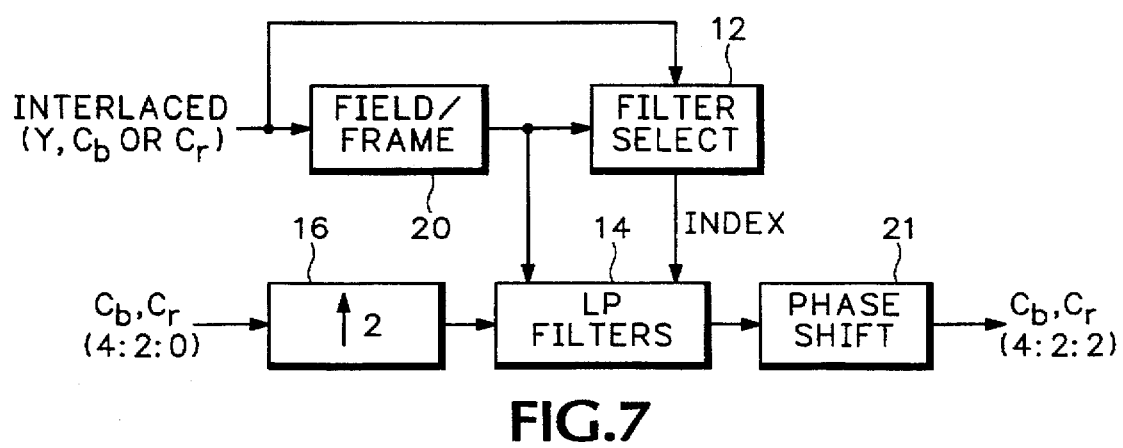
FIG.7

CHROMINANCE RESAMPLING FOR COLOR IMAGES

BACKGROUND OF THE DISCLOSURE

The present invention relates to video signal format conversion, and more particularly to the upsampling of chrominance components of a color image in a color subsampled domain to a required resolution.

Based on classical three-color theory, color images are typically represented by three components: Red, Green and Blue (RGB). For most natural images there is a large statistical correlation between the three components. In the television world to provide backward compatibility with monochrome equipment the RGB signals are linearly transformed into a luminance (Y) and two color difference (R-Y, B-Y) signals. In almost all the television standards luminance is defined as:

$$Y=0.299R+0.587G+0.114B.$$

The NTSC standard uses I and Q color differences for the color representation:

$$I=-0.27(B-Y)+0.74(R-Y)$$

$$Q=0.42(B-Y)+0.48(R-Y).$$

The PAL and ITU-R BT-601 standards use U and V, also called $C_B$ and $C_R$, color differences:

$$U=0.493(B-Y)$$

$$V=0.877(R-Y).$$

To reduce the bandwidth requirements for transmitting color images and to reduce the storage requirements, the color difference signals are horizontally lowpass filtered. In digital images the filtered color difference signals are subsampled by a factor of two horizontally. The color image representation in this subsampled form is referred to as a 4:2:2 signal, and the original unsubsampled signal is referred to as a 4:4:4 signal. In a majority of video compression standards, such as JPEG and MPEG, the digitized color difference components are lowpass filtered and followed by subsampling by a factor of two both horizontally and vertically. The color image representation in this subsampled form is referred to as a 4:2:0 signal.

The usual procedure for upsampling a subsampled chrominance difference signal is to have an interpolator, or data expander, that inserts zero between every two chrominance input samples. A lowpass filter then removes or suppresses the spectral replicas formed due to the expansion. This procedure does not use the edge information present in the luminance signal, and performs a blind interpolation of the chrominance which results in soft interpolated color edges. Such soft interpolated chrominance may be perceived as soft luminance in some color specifications, such as EBU/PAL.

Thus what is desired is a chrominance resampling of color images that uses the edge information present in luminance to generate sharper color edges in upsampled chrominance signals.

SUMMARY OF THE INVENTION

Accordingly the present invention provides chrominance resampling for color images that upsamples chrominance components in a color domain to a required resolution. A full resolution luminance signal is input to a filter selector circuit which outputs an Index signal determined by the presence/absence of edges in the picture image. The Index signal is used to select a particular filter from a bank of filters. A subsampled chrominance signal is input to an expander, and the resulting expanded chrominance signal is then input to the filter selected by the Index signal. The output from the selected filter is the upsampled chrominance signal. For interlaced video signals the luminance signal, or optionally the chrominance signals, are input to a field/frame decision circuit to determine whether there is sufficient local motion to treat the two fields of a frame separately or as a progressive frame. Based upon the field/frame decision and the luminance signal the filter selector generates the Index signal, which together with the field/frame decision is used to select the particular filter from the filter bank. The output of the filter is then subjected to a phase shift to co-site chrominance samples with corresponding luminance samples to produce the upsampled chrominance signal.

The objects, advantages and other novel features of the present invention are apparent from the following detailed description when read in conjunction with the appended claims and attached drawing.

BRIEF DESCRIPTION OF THE DRAWING

FIG. 3 is a pictorial view of the spatial position of luminance and chrominance samples for interlaced 4:2:0 data.

FIG. 4 is a pictorial view of the vertical and temporal position of luminance and chrominance samples for interlaced 4:2:0 data.

FIG. 5 is a pictorial view of the vertical and temporal position of luminance and chrominance samples after chrominance interpolation for interlaced 4:2:0 data according to the present invention.

FIG. 6 is a pictorial view of the vertical and temporal position of luminance and chrominance samples after chrominance phase shifting according to the present invention.

FIG. 7 is a block diagram view of chrominance resampler for interlaced video according to the present invention.

FIG. 8 is a pictorial view of the spatial blocking structure used for field/frame decision making according to the present invention.

DESCRIPTION OF THE PREFERRED EMBODIMENT

Figure 1:
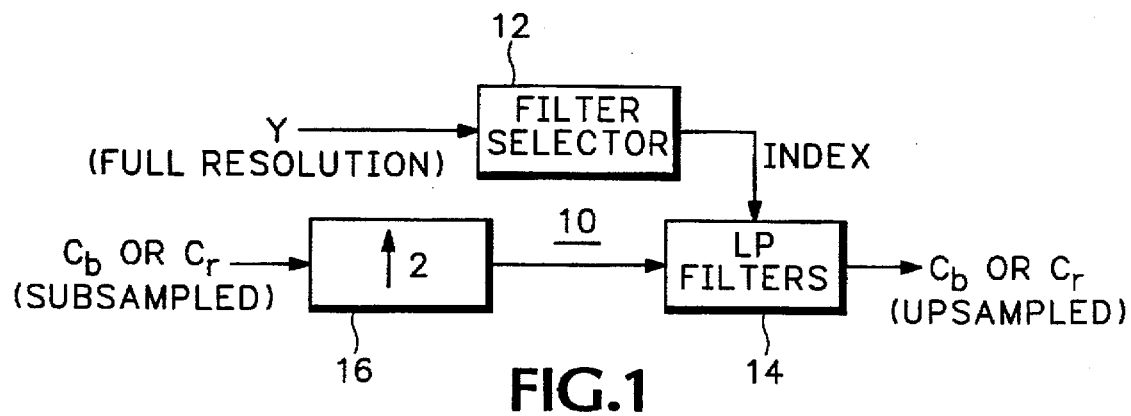
FIG. 1 is a block diagram view of a system for chrominance resampling according to the present invention.

Referring now to FIG. 1 a chrominance resampling system 10 is shown that uses edge information contained in a luminance signal Y in order to generate crisp chrominance edges in the corresponding upsampled chrominance signals $Cb_{up}$, $Cr_{up}$. The full resolution luminance signal Y is input to a filter selector 12. The output from the filter selector 12 is an Index signal to a bank of lowpass filters 14 for selecting one of the filters for processing the chrominance signal. The selected filter may be either linear or nonlinear. The subsampled chrominance signals $Cb_{sub}$, $Cr_{sub}$ are input to a standard expander 16 where zeros are inserted between every two input samples. The interpolated, or expanded, chrominance signal is input to the selected filter from the lowpass filter bank 14 according to the Index signal to produce the upsampled chrominance signal. This scheme is intended for video/picture format conversions, such as 4:2:2 to 4:4:4, 4:1:1 to 4:4:4, 4:2:0 to 4:2:2, etc. This process results in a crisp interpolated color picture without the color bleeding artifacts seen with the prior art procedure. The Index signal from the filter selector 12 may be (1) a continuously settable index using an infinitely large number of lowpass filters, or (2) a discrete index resulting in a finite number of lowpass filters.

Figure 2:
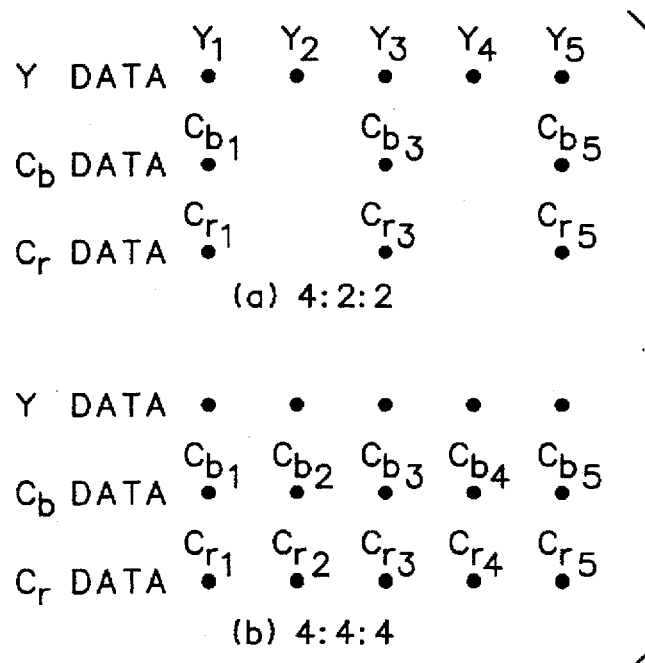
FIG. 2 is a pictorial view of the position of luminance and chrominance samples in a scan line for (a) 4:2:2 data and for (b) 4:4:4 data.

An example for a conversion from 4:2:2 to 4:4:4 in a simple implementation using three linear filters is described below. The locations of the luminance and chrominance samples in a scan line for the two formats are shown in FIG. 2. The task of the chrominance resampler is to derive the chrominance samples that are not present in the 4:2:2 data, but required in the 4:4:4 representation, i.e., the even values of the chrominance samples.

The missing chrominance samples may be generated to meet certain goals. If the goal is to make the local gradients of chrominance the same as that of luminance:

$$\frac{Cb2-Cb1}{Cb2-CB3} = \frac{Cr2-Cr1}{Cr2-Cr3} = \frac{Y2-Y1}{Y2-Y3}$$

In this case samples Cb2 and Cr2 may be generated through the procedure:

if (Y1–Y3)>T*(Y1+Y3) then $\zeta \triangleq (Y2-Y3)/(Y1-Y3)$ else $\zeta = 0.5$ endif $Cb2 = \zeta * Cb1 + (1-\zeta) * Cb3$ $Cr2 = \zeta * (Cr1 + (1-\zeta) * Cr3$ T is a contrast threshold, 0<T<1, and may be set to a value of 0.1, and $\zeta$ is a variable that controls the filter coefficients. The first step above determines the presence of a luminance edge, and the variable $\zeta$ is set for linear interpolation when no edge is present.

The position of an edge in the color image may also be estimated using the luminance signal as indicated below, and then the edge position information may be used to perform the chrominance signal interpolation. For example the weighting factor $\zeta$ in the procedure described above may be found from the edge location estimation to be:

$\zeta = 0.75\{1 + s\sqrt{1/(4+s^2)}\}$, where s is given by:

$s \triangleq (m_3 + 2m_1^3 - 3m_1 m_2)/\sigma^3$ and $m_1$, $m_2$ and $m_3$ are the first, second and third moments of the luminance signal respectively, and 0 is the standard deviation of the luminance signal. For simplicity the three luminance samples may be used to compute the moments and sigma as follows:

$m_1 = (\frac{1}{3}) * (Y1 + Y2 + Y3)$ $m_2 = (\frac{1}{3}) * (Y1^2 + Y2^2 + Y3^2)$ $m_3 = (\frac{1}{3}) * (Y1^3 + Y2^3 + Y3^3)$ $\sigma = \sqrt{(m_2 - m_1^2)}$ The procedure described above may repeatedly be used horizontally two times to convert 4:1:1 material to 4:4:4 material. It also may be applied vertically to convert progressive 4:2:0 material to 4:2:2 material.

For vertical interpolation from 4:2:0 to 4:2:2 where the source is interlaced video rather than progressive video, the procedure may be as follows. The spatial positions of luminance and chrominance samples of an interlaced 4:2:0 video frames are shown in FIG. 3. The luminance and chrominance samples having an "odd" first index belong to the odd field of the input video, and the samples having an "even" first index belong to the even field. The vertical and temporal displacement of these samples is shown in FIG. 4.

The chrominance interpolation for interlaced 4:2:0 to 4:2:2 may be conceptually thought of as two steps. These steps may easily be merged into a single step of interpolation. In the first step the chrominance samples are interpolated vertically to double the input sample rate and associate one Cb and one Cr sample with each Y sample. However the Cb, Cr samples are not co-sited with the luminance samples, as shown in FIG. 5. In the second step these Cb, Cr samples are given phase shifts so that the resultant Cb, Cr samples are co-sited with the luminance samples, as shown in FIG. 6, to produce the 4:2:2 output.

The first step of the interpolation depends upon the picture characteristic in the neighborhood of the interpolated chrominance sample. The luminance samples of the interlaced video, and optionally the chrominance samples, are used to decide if there is motion between the two fields of a frame. This decision is made on small blocks of the frame in a field/frame decision circuit 20, as shown in FIG. 7. If there is not enough motion between fields, the block may be considered progressive for the purposes of chrominance interpolation. In which case the vertical interpolation of chrominance uses the chrominance samples from both fields. However if there is significant motion between fields, the block is considered interlaced and the vertical interpolation of chrominance uses chrominance samples from the same field as the interpolated chrominance sample. The field/frame decision from the decision circuit 20 is input as an additional input to the filter selector 12 and the lowpass filter array 14.

Figure 9:
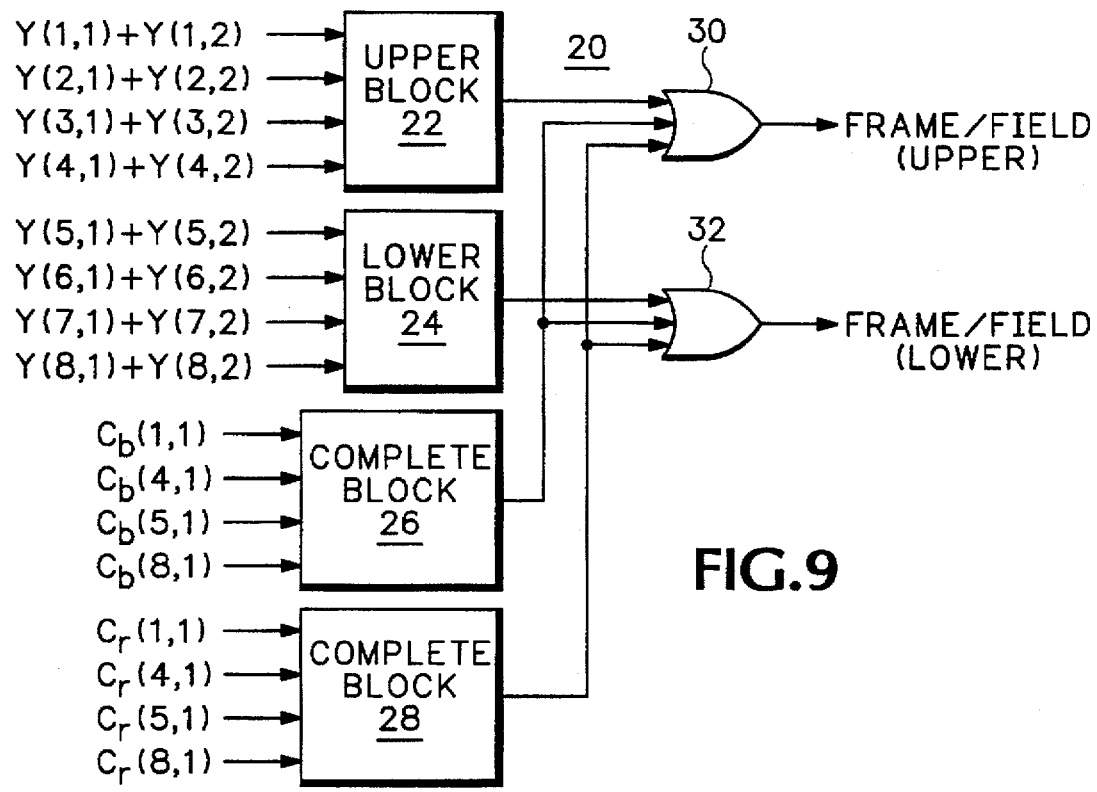
FIG. 9 is a block diagram view of a field/frame decision circuit according to the present invention.

The field/frame decision is made on small blocks of pixels as shown in FIG. 8. These blocks of samples are input to the field/frame decision circuit 20, shown in greater detail in FIG. 9. The upper four luminance pixels in the block are input to an upper block decision circuit 22 while the lower four luminance pixels in the block are input to a lower block decision circuit 24. The outputs from the upper and lower block decision circuits 22, 24 are input to respective OR gates 30, 32. The respective chrominance signals are input to respective complete block decision circuits 26, 28, with outputs provided to both of the OR gates 30, 32. The field/frame decision of "Upper" block depends on the categorization of luminance samples from "Upper" block as well as the field/frame decision on chrominance samples from "Complete" block. Likewise the field/frame decision of "Lower" block depends on the categorization of luminance signals from "Lower" block as well as the field/frame decision on chrominance samples from "Complete" block.

Figure 10:
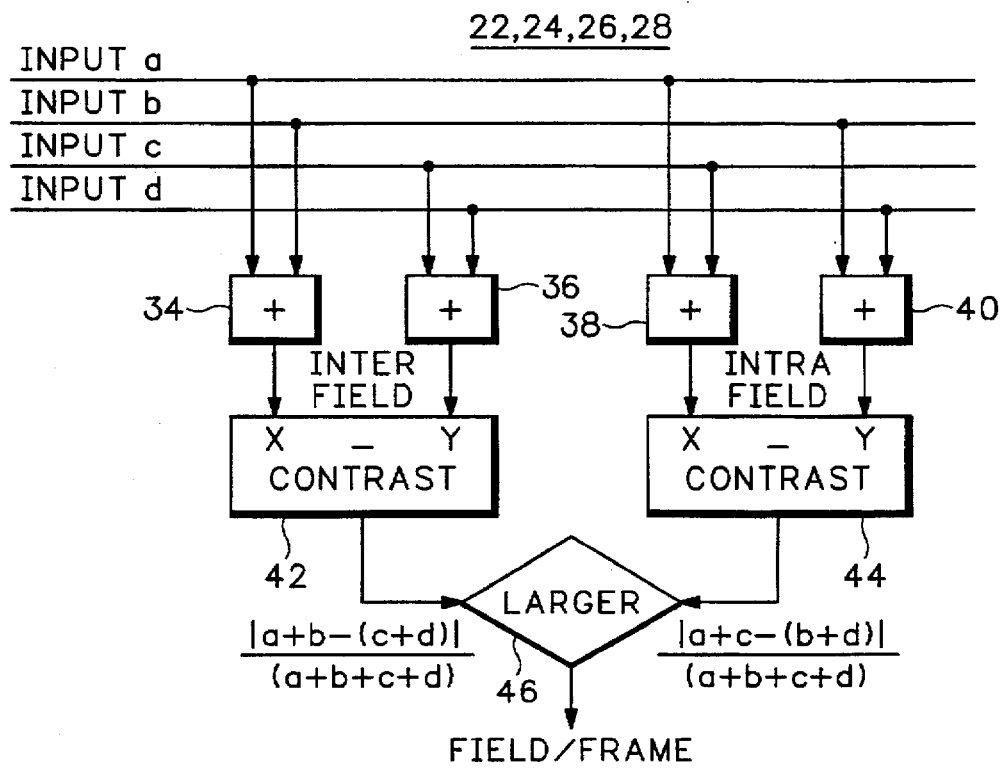
FIG. 10 is a block diagram of a subset of the field/frame decision circuit of FIG. 9.

A representative field/frame decision circuit 22, 24, 26, 28 is shown in greater detail in FIG. 10. The first and second inputs are input to a first summing circuit 34, the third and fourth inputs are input to a second summing circuit 36, the first and third inputs are input to a third summing circuit 38, and the second and fourth inputs are input to a fourth summing circuit 40. The outputs from the first and second summing circuits are input to a first contrast circuit 42, while the outputs from the third and fourth summing circuits are input to a second contrast circuit 44. Contrast may be defined as:

$$\text{Contrast}(x,y) \triangleq (|x-y|)/(x+y)$$

The outputs from the two contrast circuits 42, 44 are input to a comparison circuit 46 that determines the field/frame decision based on four inputs by making two "larger than" comparisons as follow:

$$\text{Decision} = \begin{cases} \text{"field"} & \text{if}(|a+c-b-d| > |a+b-c-d|), \text{ and} \\ & (|a+c-b-d| > T^*|a+b+c+d|) \\ \text{"frame"} & \text{otherwise} \end{cases}$$

where T is the contrast threshold.

The interpolation is performed based on the field/frame decision. In the interpolation process the chrominance samples that exist in 4:2:0 are retained in the upsampled domain. The generation of chrominance samples at sites (2,1), (3,1), (6,1), etc. depends on the flame/field decision made in the first step. If a frame decision was made, the interpolation uses the spatially neighboring samples from both fields for interpolation. For example Cb(3,1) is interpolated from Cb at sites (1,1), (4,1) and (5,1). If a field decision is made, the interpolation uses the spatially neighboring samples from the same field, i.e., for Cb(3,1) the interpolation is performed using (1,1) and (5,1). A large variety of linear and nonlinear filters may be used for this interpolation.

Going from the interpolated chrominance samples shown in FIG. 5 to those shown in FIG. 6 requires vertically phase offsetting the chrominance samples. This may be performed in a number of standard ways, such as (1) linear interpolation using two samples or (2) longer finite impulse response filters. The phase offsetting step also uses the frame/field decision made earlier. If the decision is "field", the weighted-sum computed for the phase shifting uses samples from the same field. Otherwise if the decision is "frame", the weighted-sum computed for the phase shifting uses samples from both fields.

Thus the present invention provides a chrominance resampler for color images that provides crisp chrominance edges by selecting a filter for lowpass filtering that is a function of edges of the color image using information from the luminance component of the color image.

What is claimed is:

1. A chrominance resampler of the type that interpolates a subsampled chrominance component of a color image to produce an upsampled chrominance component comprises:
   a plurality of lowpass filters coupled in parallel to receive the interpolated subsampled chrominance component as an input and to provide the upsampled chrominance component at an output from one of the lowpass filters in response to a selector signal, each lowpass filter having a different characteristic; and
   means for generating the selector signal from a luminance component of the color image, the generating means detecting the position of edges in the color image from the luminance component and providing the selector signal as a function of the position of the edges.

2. The chrominance resampler as recited in claim 1 further comprising means for detecting motion between fields of the color image when the color image is in interlaced format to generate a field/frame signal, the field/frame signal being input to the lowpass filters as part of the selector signal and to the generating means as a control signal to determine whether chrominance samples from just one field or from the entire frame of the color image are used for interpolation.

3. The chrominance resampler as recited in claim 2 further comprising means for phase shifting the upshifted chrominance component to be co-sited with the corresponding luminance component.

4. The chrominance resampler as recited in claim 2 wherein the detecting means comprises:
   means for combining inter field samples of the luminance component to produce an interfield output and for combining intrafield samples of the luminance component to produce an intrafield output; and
   means for comparing the interfield output with the intrafield output to generate the field/frame signal, the field/frame signal indicating "field" when motion is detected and indicating "frame" otherwise.

5. The chrominance resampler as recited in claim 4 wherein the combining means comprises:
   first and second summers for combining adjacent vertical luminance samples from adjacent fields of the color image to produce the interfield output;
   second and third summers for combining adjacent vertical luminance samples from the same field of the color image to produce the intrafield output.

6. The chrominance resampler as recited in claim 5 wherein the comparing means comprises a comparator that provides the "field" indicator for the field/frame signal when the interfield output is larger than the intrafield output and the interfield output is greater than the sum of the vertical pairs from both fields of the color image times a threshold value, and otherwise provides the "frame" indicator for the field/frame signal.

7. A method of chrominance resampling that includes the step of interpolating a subsampled chrominance component of a color image to produce an upsampled chrominance component comprising the steps of:
   generating a selector signal from a luminance component of the color image as a function of detected edges of the color image; and
   selecting a filter from among a plurality of lowpass filters coupled in parallel to receive the interpolated subsampled chrominance component as a function of the selector signal, each lowpass filter having a different characteristic; and
   providing the upsampled chrominance component at an output of the selected filter.

8. The method as recited in claim 7 further comprising the steps of:
   detecting motion between fields of the color image when the color image is in interlaced format to generate a field/frame signal;
   inputting the field/frame signal to the plurality of lowpass filters as part of the selector signal and to the selecting step as a control signal to determine whether chrominance samples from just one field or the entire frame of the color image are used in the interpolating step.

9. The method as recited in claim 8 further comprising the step of phase shifting the upshifted chrominance component to be co-sited with the corresponding luminance component.

10. The method as recited in claim 8 wherein the detecting step comprises the steps of:

combining interfield samples of the luminance component to produce an interfield output and intrafield samples of the luminance component to produce an intrafield output; and comparing the interfield and intrafield outputs to generate the field/frame signal, the field/frame signal indicating "field" when motion is detected and indicating "frame" otherwise.

11. The method as recited in claim 10 wherein the combining step comprises the steps of:

summing adjacent vertical luminance samples from the fields of the color image to produce the interfield output; and summing adjacent vertical luminance samples from the same field of the color image to produce the intrafield output.

12. The method as recited in claim 11 wherein the comparing step comprises the steps of:

providing the "field" indicator for the field/frame signal when the interfield output is larger than the intrafield output and the sum of the vertical luminance samples from both fields of the color image times a threshold value; and providing the "frame" indicator for the field/frame signal otherwise.

* * * * *